United States Patent
Bindschedler et al.

(10) Patent No.: US 12,257,742 B2
(45) Date of Patent: Mar. 25, 2025

(54) INSTALLATION AND METHOD FOR TREATING COMPOSITE MATERIALS BASED ON THERMOPLASTIC MATERIALS

(71) Applicant: SOPREMA, Strasbourg (FR)

(72) Inventors: Pierre-Etienne Bindschedler, Strasbourg (FR); Patrick Ball, Barr (FR)

(73) Assignee: SOPREMA, Strasbourg (FR)

( * ) Notice: Subject to any disclaimer, the term of this patent is extended or adjusted under 35 U.S.C. 154(b) by 212 days.

(21) Appl. No.: 17/919,495

(22) PCT Filed: Apr. 1, 2021

(86) PCT No.: PCT/EP2021/058719
§ 371 (c)(1),
(2) Date: Oct. 17, 2022

(87) PCT Pub. No.: WO2021/213792
PCT Pub. Date: Oct. 28, 2021

(65) Prior Publication Data
US 2023/0150172 A1   May 18, 2023

(30) Foreign Application Priority Data
Apr. 22, 2020 (FR) .................................... 2004015

(51) Int. Cl.
*B29B 17/02* (2006.01)
*B29B 17/04* (2006.01)
(Continued)

(52) U.S. Cl.
CPC .......... *B29B 17/02* (2013.01); *B29B 17/0412* (2013.01); *C10C 3/007* (2013.01);
(Continued)

(58) Field of Classification Search
CPC ..... B02C 19/0056; B02C 23/14; B29B 17/02; B29B 17/0412; B29B 2017/0224;
(Continued)

(56) References Cited

U.S. PATENT DOCUMENTS

| 4,726,846 A | 2/1988 | Jackson et al. |
| 6,290,152 B1 * | 9/2001 | Zickell .................. F26B 11/045 241/23 |

(Continued)

FOREIGN PATENT DOCUMENTS

| DE | 102006004148 A1 * | 8/2007 | ............. B03B 9/065 |
| WO | 9736725 | 10/1997 | |

OTHER PUBLICATIONS

English translate (DE102006004148A1), retrieved date Jul. 26, 2024.*

(Continued)

*Primary Examiner* — Mohammed S. Alawadi
(74) *Attorney, Agent, or Firm* — IPSILON USA, LLP

(57) ABSTRACT

An installation (1) and method for treating composite products (2) based on thermoplastic material(s) for recycling purposes, the installation at least comprising means (3, 4, 4', 5, 6) for heating, for reducing size, for crushing and for separating, said means being arranged to form at least one line (1') for treating and extracting material(s) to be reused, operating as a continuous or intermittent flow, and regulated if necessary. The installation (1) is characterised in that the means (3) for heating and reducing size comprise at least one heated screw mixer, the crushing means comprise at least one roll crusher (4, 4') comprising two rolling rollers (7 and 7') that are heated and set into rotation in opposite directions, the separating means (5, 6) comprise at least one macroscopic separating means (5) in the form of a device for discharging macroscopic polluting particles present in the (Continued)

output (3'), and the separating means (5, 6) also comprise at least one microscopic separating means (6).

14 Claims, 14 Drawing Sheets

(51) Int. Cl.
*C10C 3/00* (2006.01)
*E01C 19/10* (2006.01)

(52) U.S. Cl.
CPC ............ *B29B 2017/0224* (2013.01); *B29B 2017/0472* (2013.01); *E01C 19/1004* (2013.01)

(58) Field of Classification Search
CPC .... B29B 2017/0472; B29B 2017/0217; B29B 2017/0456; B29B 2017/046; C10C 3/007; E01C 19/1004; B29K 2095/00; B29K 2105/06; B29L 2031/10; B29L 2031/108; Y02W 30/62

See application file for complete search history.

(56) References Cited

U.S. PATENT DOCUMENTS 9,440,239 B1    9/2016  Horton et al.
2014/0263779 A1  9/2014  Svec et al.

OTHER PUBLICATIONS

International Search Report dated Jun. 24, 2021.
G Guinee. "Un remploi innovateur de vieille couverture bitumineuse" Oct. 26, 2006 (Oct. 26, 2006). pp. 24-25. Retrieved from the Internet: http://www.dakweb.nl/rbf/2003-I0-Fr/RB2003-10%20P2.pdf—retrieved on Jan. 13, 2021.

* cited by examiner

INSTALLATION AND METHOD FOR TREATING COMPOSITE MATERIALS BASED ON THERMOPLASTIC MATERIALS

RELATED APPLICATION

This application is a National Phase of PCT/EP2021/058719 filed on Apr. 1, 2021, which claims the benefit of priority from French Patent Application No. 20 04015 filed on Apr. 22, 2020, the entirety of which are incorporated by reference.

The present invention concerns the field of recycling and reuse of factory and building site waste in connection with sealing materials and systems, in particular in connection with bituminous sealing membranes, and its object is an installation and a method for treating composite products based on thermoplastic materials.

FIELD OF THE INVENTION

In the context of the general tendency to seek a possibility of recycling waste, a growing need-to which at present there is no satisfactorily solution in either technical or economic terms-concerns manufacturing waste and above all building site waste in the field of sealing materials, in particular in connection with bituminous sealing membranes.

The main problem found-currently with no satisfactory solution-concerns the presence of non-recyclable contaminants which are often intermingled with the material to be recycled, such as in particular hard solid particles of metallic, mineral or other types (arising from elements for assembly, fixing, covering, or other similar elements).

In particular, demolition waste from the renovation market today represents a potential source of sealing membranes to be treated, currently estimated at 100,000 tonnes per year in France (estimate by the French Sealing Industry Association), this source being renewed each year. The cost of landfill disposal of this waste has been increasing for many years, and this trend will continue, in particular since no real industrial solution for processing demolition waste has yet been proposed.

There is therefore a strong and constant demand for an industrial solution for reducing the consumption of a dwindling fossil resource, which would be really efficient in the recycling of sealing membranes.

The constitution and hence the treatment of this waste are complex, since when building roofs are repaired, it is possible to overlay several layers of membrane one over the other and connect them by bonding or welding, and fix them mechanically to the support.

However, after a number of repairs (depending on relevant legislation in the country concerned), it is necessary and mandatory to remove the entire covering system and install a new covering on the roof (framework, roof or terrace) in the raw state.

The waste recovered from this total removal operation, called demolition waste, substantially comprises layers of bituminous membranes glued to one another and having various types of finish, in particular slate chippings, sand, composite aluminum sheets (PET alu). This waste may also contain solid contaminants, in particular insulation (PUR, XPS, mineral wool, wood fibers etc.), metal parts (metal hooks for mechanically fixed membranes, saw blades for cutting waste etc.), and various detritus associated with temporary storage in a skip on a building site (pebbles, stones, cans etc.).

Thus in connection with the need expressed above, the composite products, which it is desirable to be able to process in the context of the application field concerned by the invention, essentially comprise:

bituminous membranes containing a reinforcing structure, e.g. non-woven polyester (NWP) or glass fiber matting etc., a bituminous binder (e.g. polymer and bitumen, additives, charge etc.), surface finish (e.g. slate chippings, sand, composite aluminum sheets etc.). Potentially, these membranes are connected in successive layers which are fused to one another by heating during laying. (Dimensions of recovered sheets: ~1 m×~1 m×(1-20) cm). Alternatively, the products to be treated may comprise rolls of bituminous membrane from production (second choice). Alternatively, these membranes may be pre-crushed.

solid contaminants of various types: insulation (PUR, XPS, mineral wool, wood fibers etc.), metal parts (metal hooks for mechanically fixed membranes, saw blades for cutting waste etc.), and various detritus (pebbles, stones, cans etc.).

After the recycling treatment, the desired reusable output product in particular comprises smooth bitumen-based binders, also integrating polymers and particles or fragments of various fibers with dimensions less than 100 μm.

Also, this treatment should if possible not generate any waste, apart from the macroscopic solid contaminants which should be extracted during treatment (such as pebbles, stones, screws, bolts, nails, rivets, fragments of sheet metal or similar).

The apparatus and installations known to date for recycling the above-mentioned product types do not meet the above-described demand nor lead to the desired result, in any case not in a reliable and persistent fashion.

Thus separators for ferromagnetic (by magnet) or non-ferromagnetic (by Foucault current) metal contaminants target only one type of contaminant and cannot achieve the extraction of elements which are embedded in, intermingled with or too closely linked to the materials to be recycled.

Similarly, systems using separation techniques based on differences in density between components, such as centrifuges, densiometric tables, decanting devices or similar, are either ineffective or not economically viable.

Finally, the known systems (see in particular WO 2008/103035, US 2005/263625, EP 1 123 182 and WO 2009/090546), in the form of extruders or conveyors with conventional helical screws, are susceptible to blockage in the presence of a hard macroscopic particle (such as a bolt) or suffer significant and rapid wear in the presence of microscopic hard particles (such as sand).

BACKGROUND

The object of the present invention is to propose a solution which is improved relative to the prior art, in order to meet the above-mentioned demand.

To this end, its object is an installation for treating composite products based on thermoplastic material(s) for recycling purposes, more particularly waste containing mainly bituminous membranes, said installation comprising at least means for heating, size reduction, crushing and separation, said means being arranged so as to form at least one line for treating and extracting material(s) to be reused, operating with a continuous or intermittent flow, and possibly regulated, the installation being characterized in that:

the means for heating and size reduction comprise at least one heated screw mixer receiving the composite products to be treated, configured to allow the passage of macroscopic particles, and delivering a heterogenous output product in liquid or viscous form, in particular charged with particles and fibers;

the crushing means comprise at least one cylinder crusher comprising two heated rolling cylinders which are driven in rotation in opposite directions, the cylinders defining between them a passage gap of a few centimeters in size, into which the output product from the mixer is introduced by falling under the effect of gravity;

the separating means comprise at least one macroscopic separating means in the form of a device for discharging macroscopic contaminating particles which are present in the output product and which are not or not sufficiently reduced by the cylinder crusher associated therewith; and the separating means also comprise at least one microscopic separating means, preferably with reduction in size to a few millimeters, which is selected from the group formed by a filter suitable for the material to be recycled, a reducer, a refiner, a grinding pump, a comminutor or a combination of two of the above-mentioned means, the installation advantageously comprising, in addition to said means arranged in the indicated order, also means for supplying the mixer and means for transfer and/or storage of the decontaminated output product and/or the recycled material.

The object of the present invention is to remedy these disadvantages.

BRIEF DESCRIPTION OF THE DRAWINGS

The invention will be better understood from the following description relating to preferred embodiments, which are given as non-limitative examples and explained with reference to the appended schematic drawings in which.

DETAILED DESCRIPTION

Figure 1:
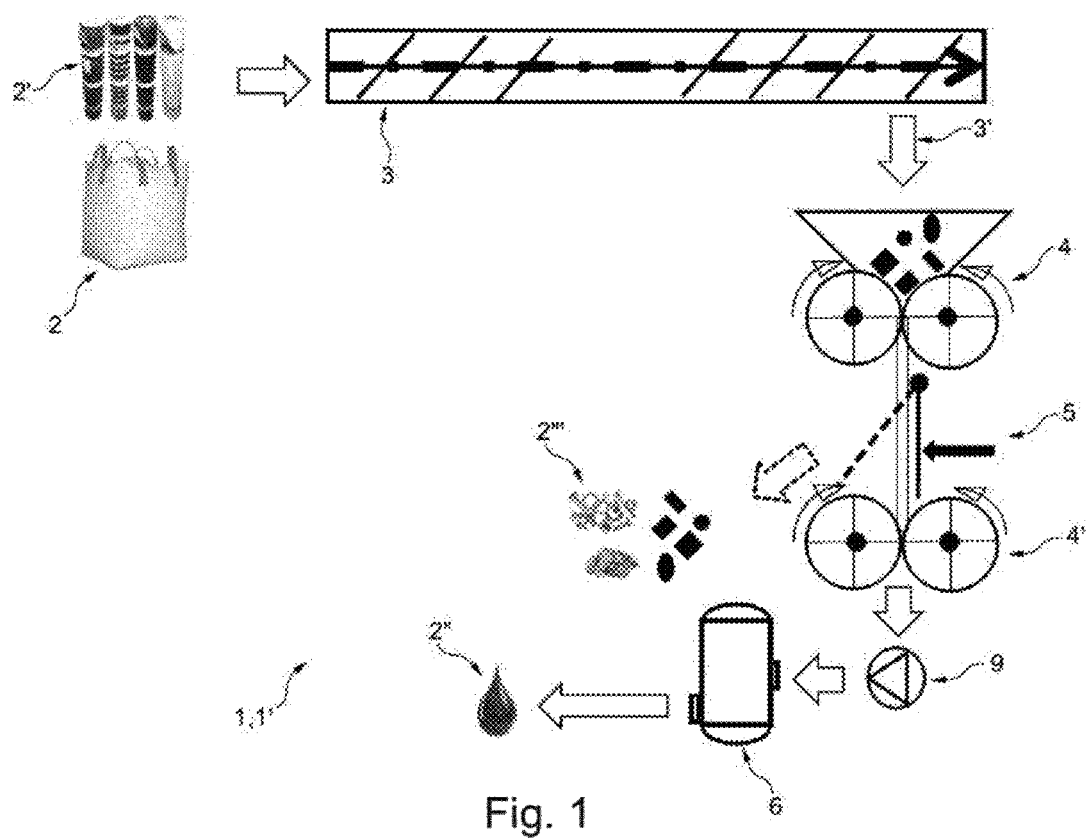
FIG. 1 is a symbolic representation of the main components of a treatment and extraction line of an installation according to the invention.
Figure 3:
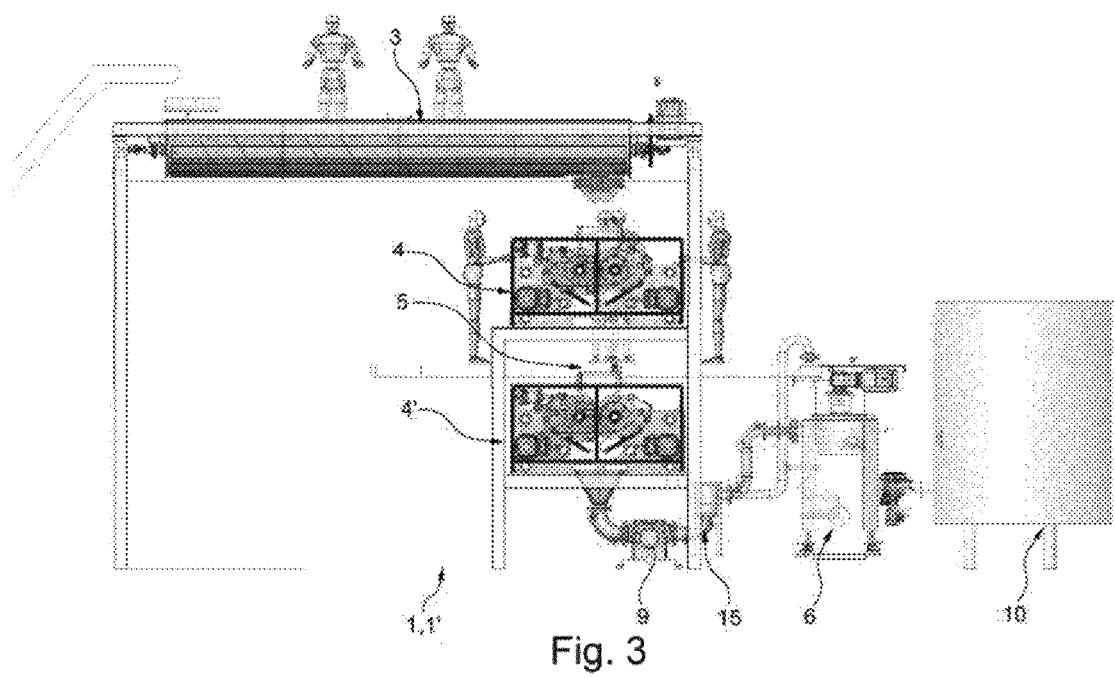
FIG. 3 is a schematic, elevation view of an embodiment of an installation according to the invention integrating a treatment and extraction line according to FIG. 1.
Figure 4:
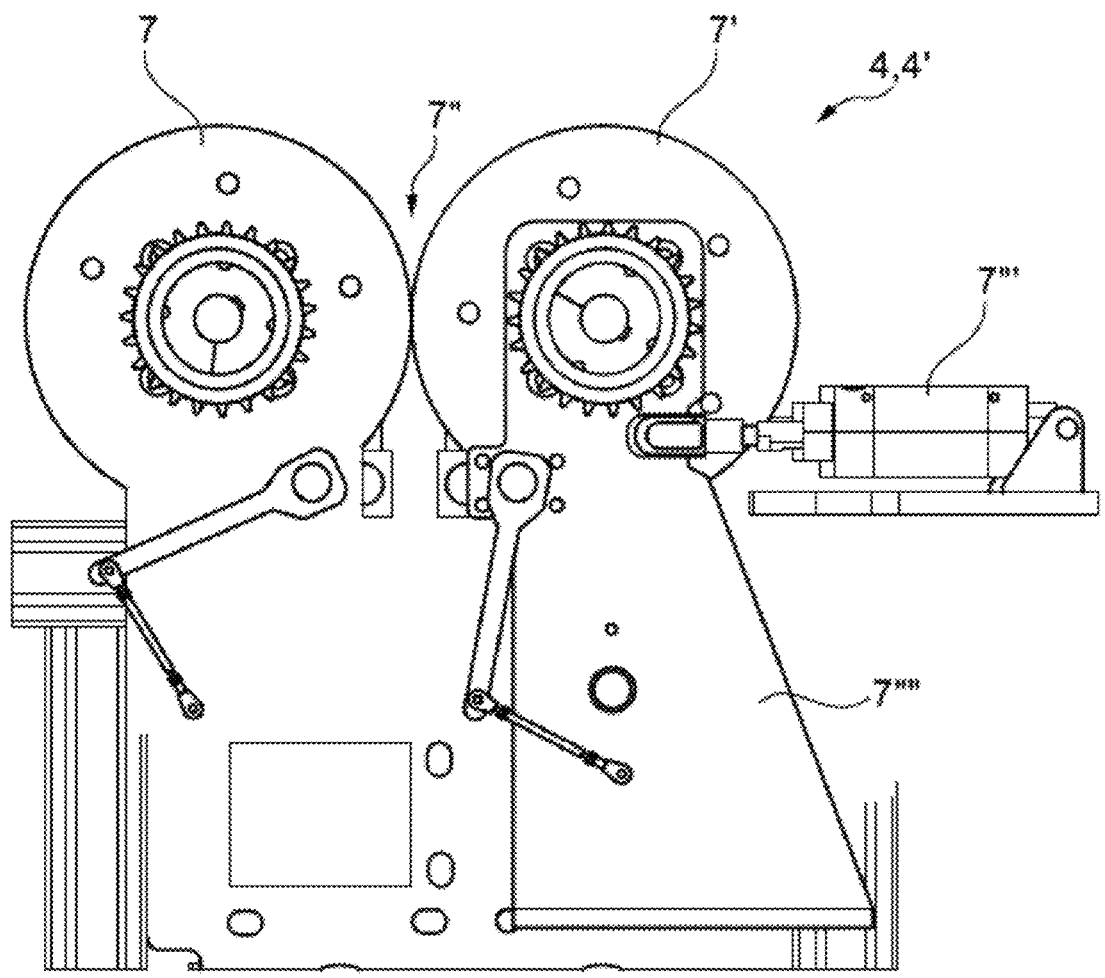
FIG. 4 is an elevation view of a cylinder crusher forming part of the crushing means of the installation from FIG. 3, in a first embodiment of the invention, in the absence of the flow of output product from the mixer (zero gap-cylinders in contact)
Figure 11:
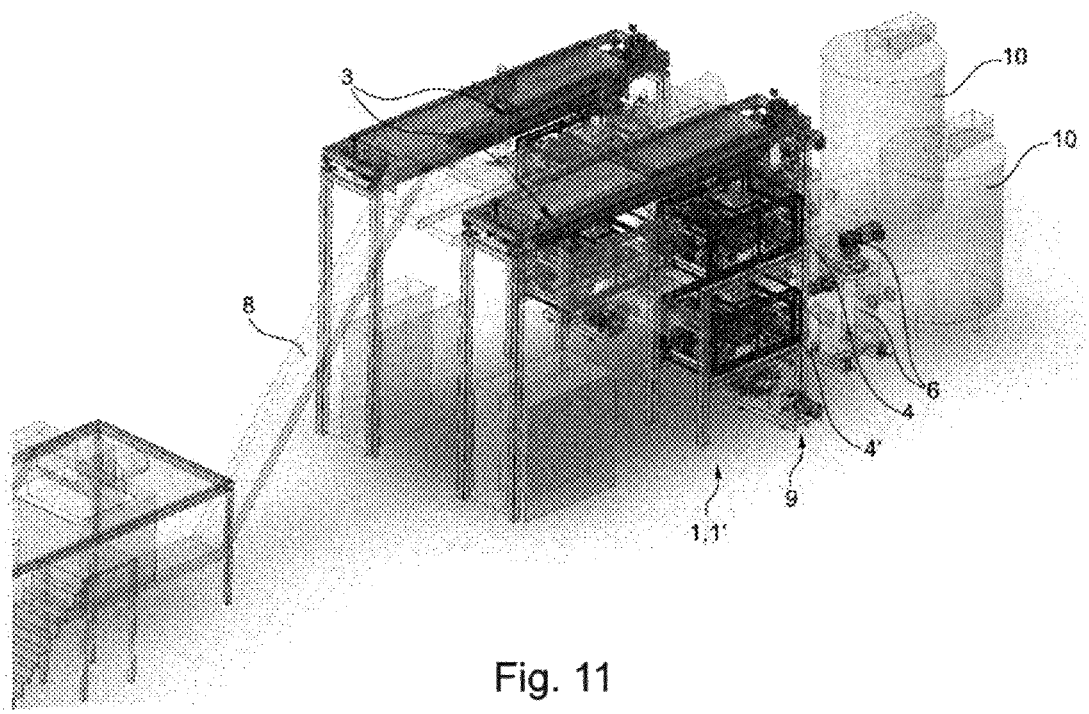
FIG. 11 is a schematic perspective view, with transparency, of an installation according to the invention comprising two treatment and extraction lines.

FIGS. 1, 3 and 11 show at least partially an installation 1 for treatment (for recycling/reuse) of composite products 2 based on thermoplastic material(s), more particularly waste containing mainly bituminous membranes 2'. This installation comprises at least means 3, 4, 4', 5, 6 for heating, size reduction, crushing and separation respectively, these means being arranged so as to form at least one treatment and extraction line 1' for material(s) to be recycled, operating with continuous or intermittent flow, and possibly regulated.

According to the invention, it is provided that:

the means 3 for heating and size reduction comprise at least one heated screw mixer receiving the composite products 2 to be treated, configured to allow the passage of macroscopic particles, and delivering a heterogenous output product 3' in liquid or viscous form, in particular charged with particles and fibers;

the crushing means comprise at least one cylinder crusher 4, 4' comprising two heated rolling cylinders 7 and 7' which are driven in rotation in opposite directions, the cylinders defining between them a passage gap of a few centimeters in size, into which the output product 3' from the mixer 3 is introduced by falling under the effect of gravity;

the separating means 5, 6 comprise at least one macroscopic separating means 5 in the form of a device for discharging macroscopic contaminating particles which are present in the output product 3' and which are not or not sufficiently reduced by the cylinder crusher 4, 4' associated therewith; and the separating means 5, 6 also comprise at least one microscopic separating means 6, preferably with reduction in size to a few millimeters, which is selected from the group formed by a filter suitable for the material to be recycled, a reducer, a refiner, a grinding pump, a comminutor or a combination of two of the above-mentioned means.

The installation 1 advantageously comprises, in addition to said means 3, 4, 4', 5, 6 arranged in the indicated order, also means 8 for supplying the mixer 3 and means 9, 10 for transfer and/or storage of the decontaminated output product and/or the recycled material 2".

It will be noted that by the specific ordered sequence of suitable extraction and transformation operations, the installation 1 achieves a progressive, efficient, reliable and reproducible treatment leading to a final recycled output product of constant quality for specific input products, wherein said output product may be used for the production of new sealing products.

The mixer 3 may be supplied either with products 2 in the form of raw waste, which may in some cases form the subject of prior sorting (manual or automatic), or with pre-treated waste which has undergone a first cutting and size reduction operation (chippings, fragments, pieces), for example in a first upstream station 16 comprising one or more crushers 16' arranged in series.

Figure 12:
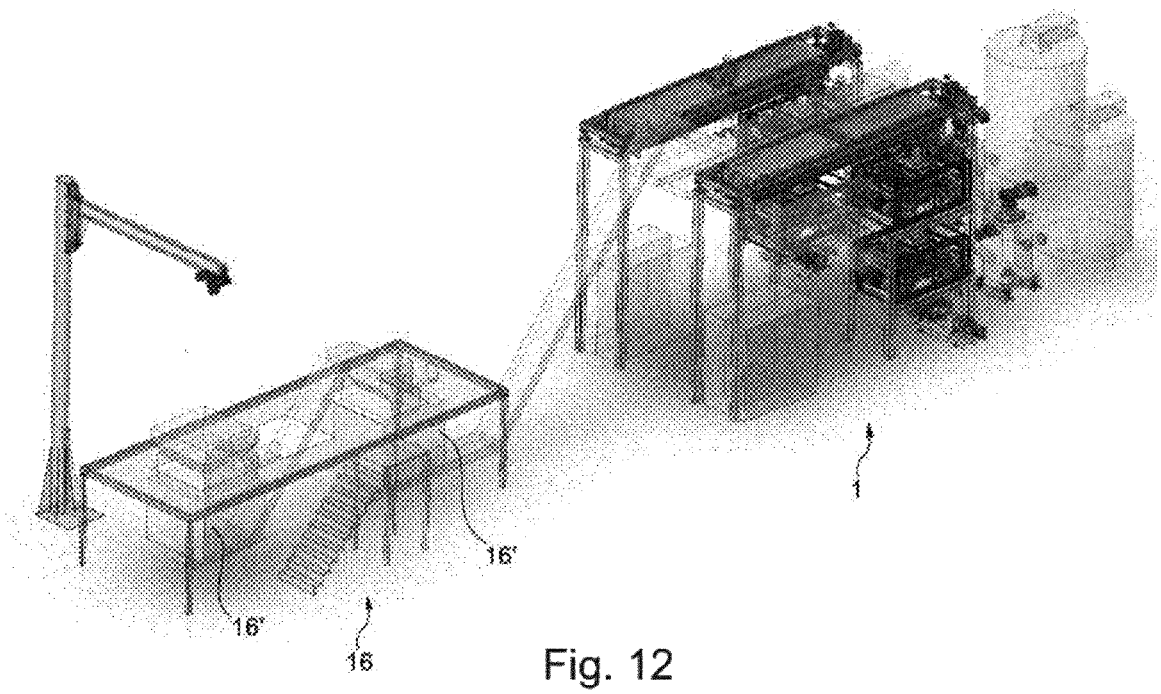
FIG. 12 is a schematic perspective view, with transparency, of a recycling site integrating the installation of FIG. 11.

The installation 1 may comprise either an extraction and treatment line 1' (FIGS. 1 and 3, or several lines 1' of this type mounted in parallel (FIGS. 11 and 12).

Also, as indicated, the heated mixer 3 is "permeable" to hard macroscopic particles 2" which are resistant to the temperatures reached therein (in other words, they do not block said mixer 3), comprising for example guidance paths between the inlet and outlet for such particles 2", which then remain in the liquid or semiliquid output product 3' discharged by the mixer 3.

Figure 5:
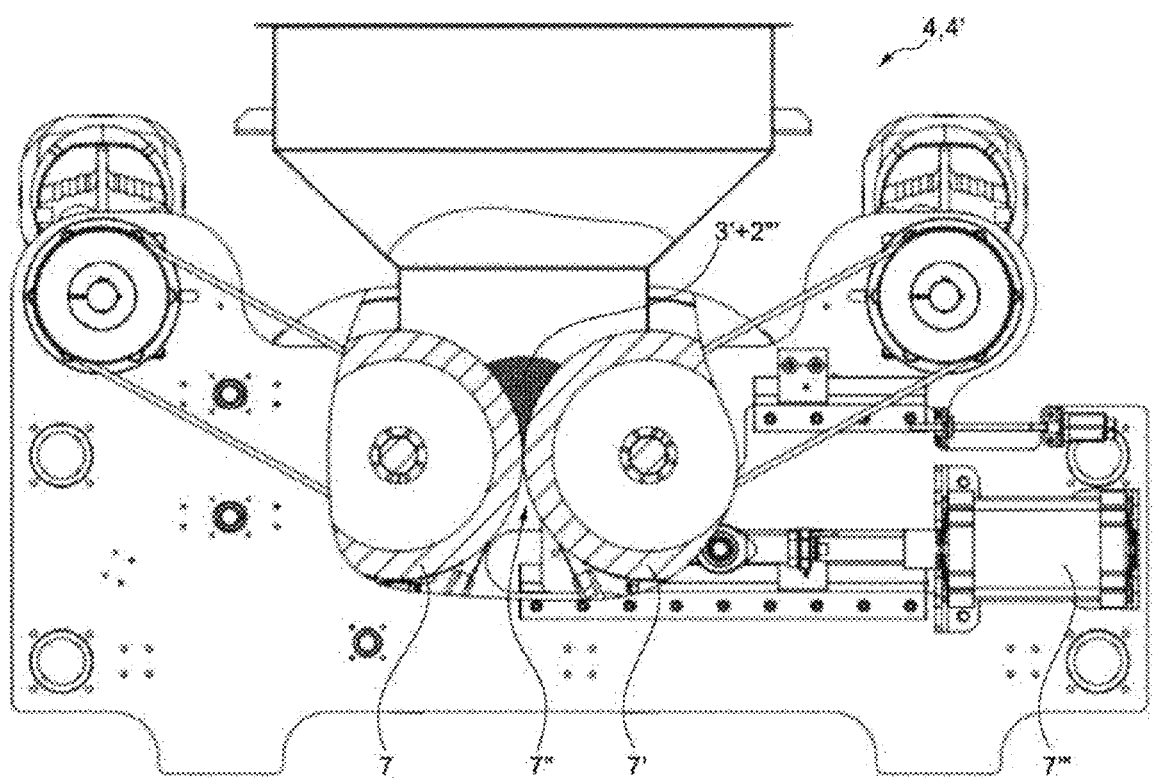
FIG. 5 is a partial elevation view, partially cut-away, of a cylinder crusher according to a second embodiment of the invention during rolling of a flow of output product coming from the mixer (preset gap)
Figure 6:
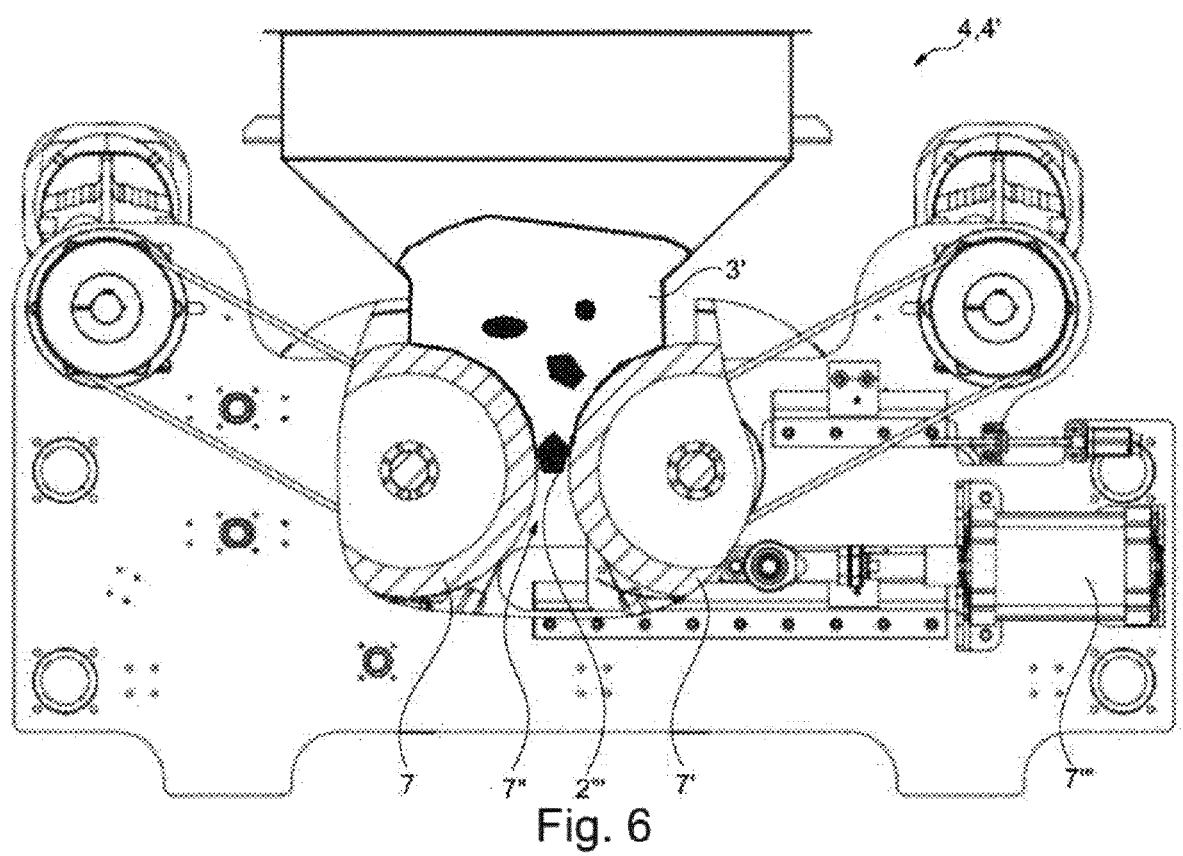
FIG. 6 is a view similar to FIG. 5 illustrating the additional spacing of the crusher cylinders during passage of a hard macroscopic particle.
Figure 7:
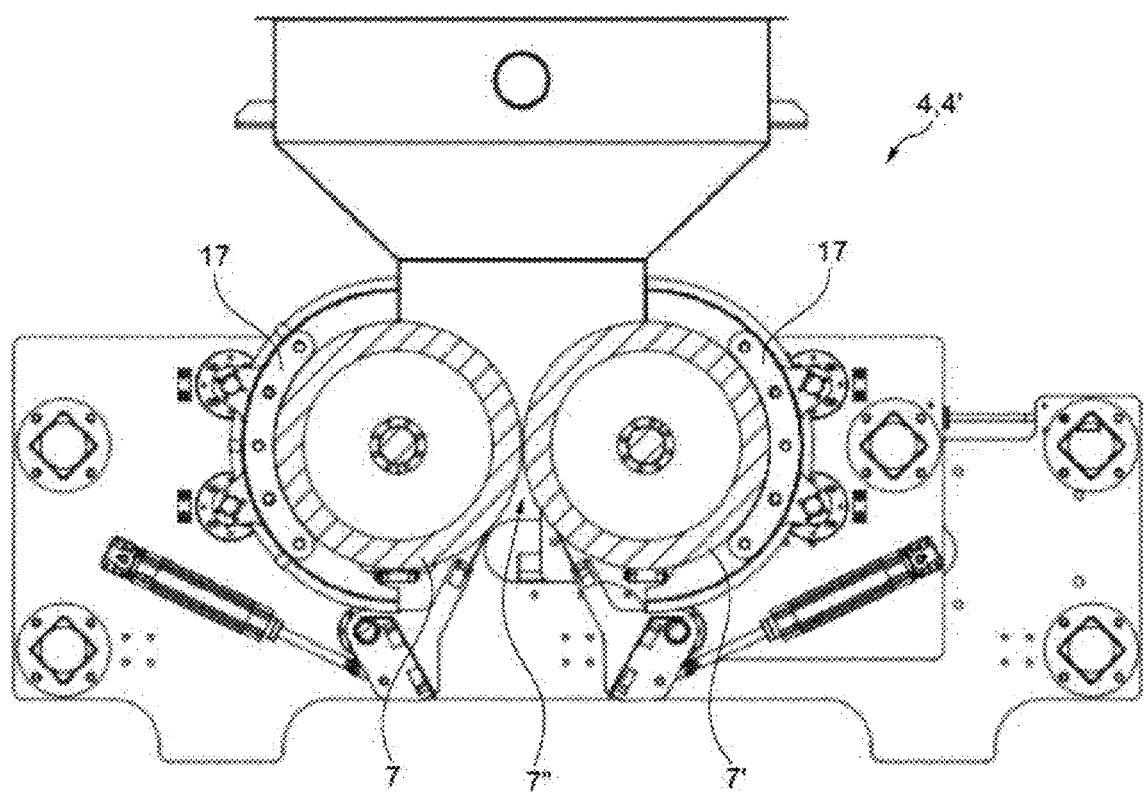
FIG. 7 is a partial sectional view of the crusher from FIG. 5, showing other structural details.

This output product may be transferred directly to the crushing means 4, 4' or be temporarily stored (by accumulation) in a reservoir or buffer hopper, preferably heated, as illustrated on FIGS. 5 to 7.

As will appear from FIGS. 1, 2 and 13A, the discharge device 5 is arranged below the only or first cylinder crusher 4 in the path of the falling flow of output product 3' exiting the latter, and comprises a movable means 5' for the in-flight ejection or extraction of macroscopic contaminating particles 2''' from the flow of output product 3', with or without temporary interruption of said flow, in response to an actuation signal supplied by said cylinder crusher 4.

Figure 2:
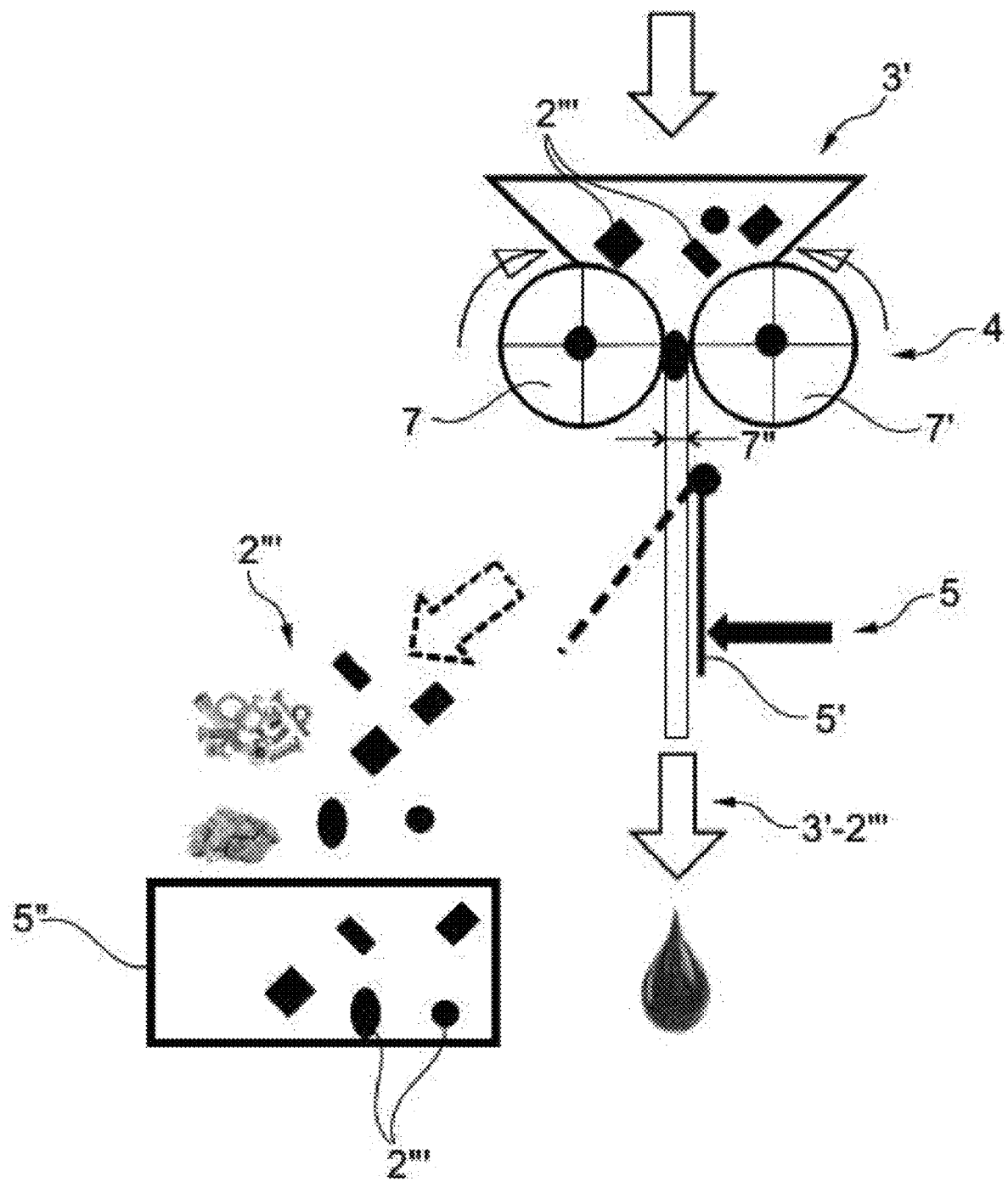
FIG. 2 is a symbolic representation, on a different scale, of a functional assembly (roller crusher/macroscopic separating means) forming part of the treatment and extraction line from FIG. 1.

Advantageously, the actuation signal corresponds to an abnormal movement of at least one movably mounted cylinder 7 of the two cylinders 7, 7' of the crusher 4 concerned, or to an abnormal increase in the preset passage gap 7" between the two cylinders 7 and 7', caused by the passage between said cylinders of a least one contaminating particle 2''' which has a size exceeding a threshold value and which is resistant to crushing (see FIGS. 2 and 6).

Figure 13A:
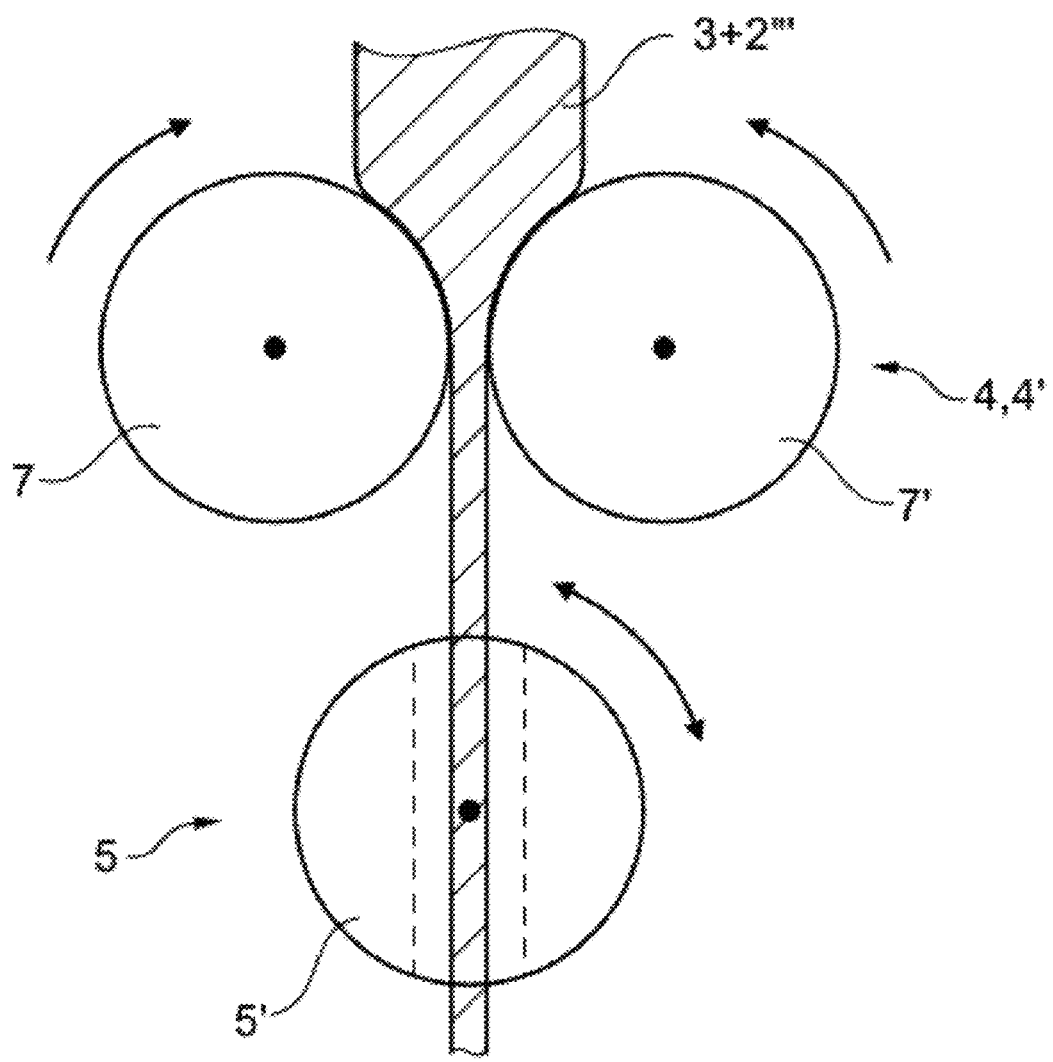
FIG. 13A is a schematic representation, similar to that of FIG. 2, of a variant embodiment of the assembly (roller crusher/macroscopic separating means)
Figure 13B:
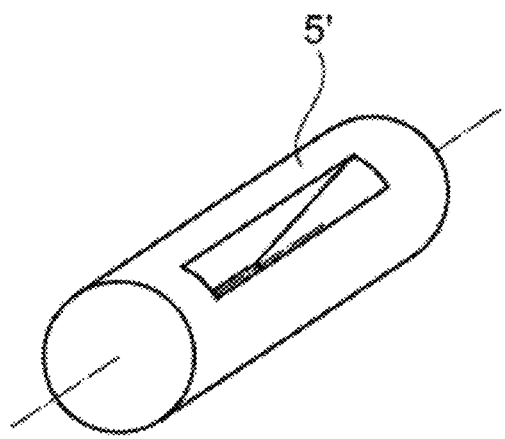
FIG. 13B is a perspective view of the cylindrical pivoting element forming part of the separating means of FIG. 13A.

Preferably, the discharge device 5 comprises an element 5', movable by pivoting or translation, which expels the target contaminating particle(s) 2''' from the flow of output product 3', or temporarily diverts or interrupts said flow, in the form of a sheet or screen, following an actuation command (see FIGS. 2, 13A and 13B).

In relation to the appended figures, it will be clear from the above that the hot liquid output product 3' containing hard macroscopic particles 2" passes under the effect of gravity through the preset gap 7" of at least one crusher 4 with double rotating cylinders 7, 7', thus undergoing a rolling operation (typically a gap of around 0.5 to 5.0 mm, preferably from around 0.5 to 2.0 mm).

As shown in FIGS. 1, 3, 11 and 12, the crushing means comprises at least two successive cylinder crushers 4 and 4' which have different sizes of gap 7" and are arranged one below the other, aligned relative to the falling flow of output product 3', the device 5 for discharging macroscopic contaminating particles 2''' being arranged between the first crusher 4 and the second crusher 4'.

The second cylinder crusher 4', vertically aligned with the first crusher 4, advantageously has a smaller gap 7" than that of the first crusher 4. It may in some cases be associated with a second discharge device 5.

The movable element 5' may for example take the form of a pivoting flap (FIGS. 1 and 2), which may interfere with the liquid/viscous sheet or membrane of output product 3' leaving the gap 7" of the crusher 4, and momentarily divert from this a part containing at least one hard macroscopic particle 2" (not crushed by rolling between cylinders 7 and 7'), advantageously towards the collecting receptacle 5".

The movable element 5' may also comprise a drum-type rotating element with a through opening aligned with the flow of output product 3' leaving the gap 7", wherein said flow may be momentarily diverted by rotation of the drum through 90° so that the part of the flow of output product 3' containing at least one hard macroscopic particle 2' is blocked from later processing (FIGS. 13A and 13B).

As also shown in FIGS. 4 to 7, the gap 7"—and in some cases, the resistive compression force-between the cylinders 7 and 7' may be determined by a ram-type actuator 7''', which may be associated with an imbalance mechanism 7''''.

The cylinders 7 and 7' are preferably heated, either from the inside or via heating scrapers 17 which may also clean their surface (FIG. 7).

Figure 8A:
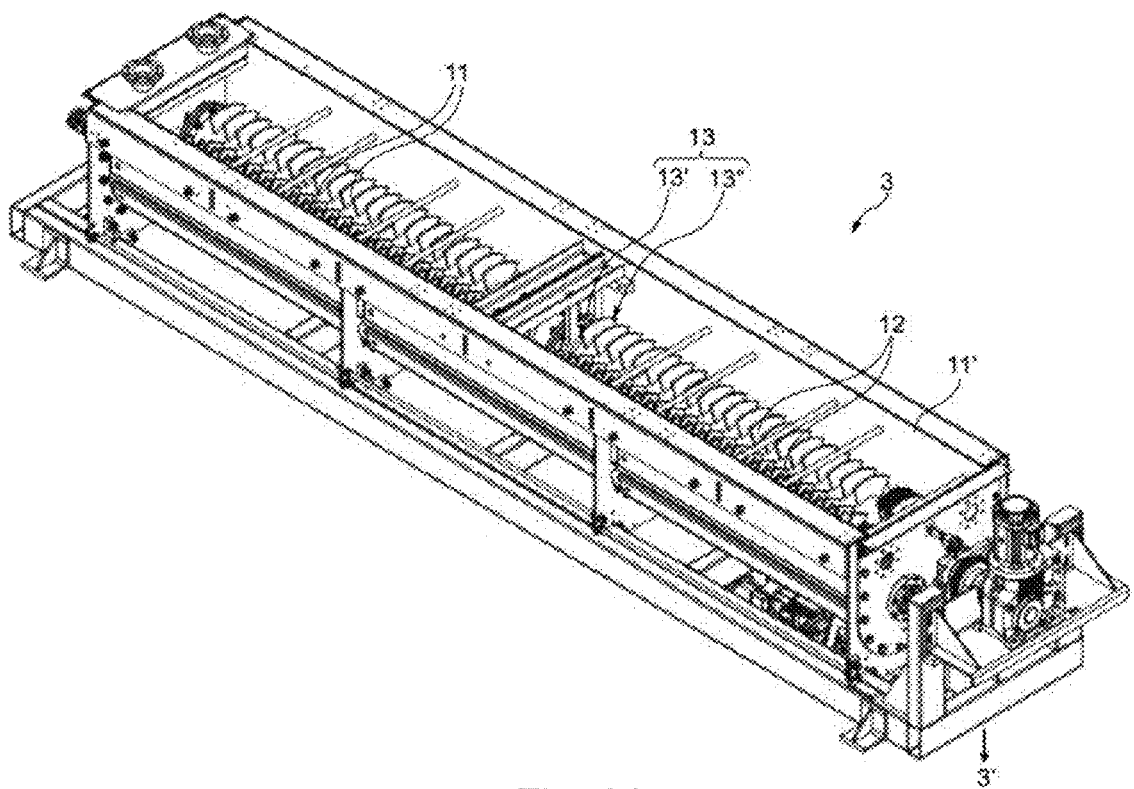
FIG. 8A is a perspective view of a double screw mixer forming part of the installation from FIGS. 1 and 3 (the cover closing the trough being removed)
Figure 8B:
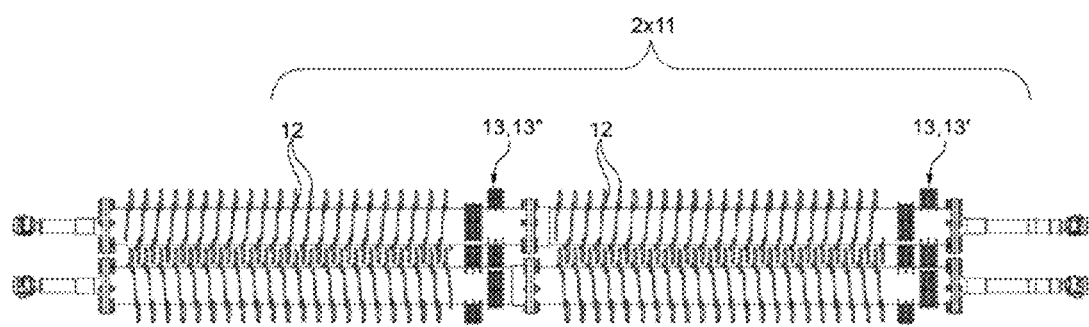
FIG. 8B is a schematic top view of the two screws forming part of the mixer from FIG. 8A.

According to a characteristic of the invention, shown in particular on FIGS. 8A and 8B, the screw mixer 3 comprises two parallel heating screws 11 mounted in a heating trough 11' and having discontinuous helical threads, which are mutually inter-penetrating and each formed from separate, flat and level blades 12 mounted in an inclined manner on the support shaft of the screw 11 concerned.

Starting in some cases from the sheets or rolls of membranes 2' as the main input product 2, because of the combined actions of shearing and heating, such a structure allows the provision at the outlet from the mixer 3 of a hot liquid output product 3' (temperature for example between 140° C. and 220° C., above the melting/softening temperature of the mainly thermoplastic binder). Because of the discontinuous nature of the threads of the two screws 11 of the mixer 3, the latter may accommodate the presence and transfer of hard macroscopic particles 2" without risk of blocking.

Preferably, and so as to at least temporarily intensify the mechanical breakdown action inside the mixer 3, the latter may also comprise at least one shearing module 13 formed by at least a first group of separate, flat and level blades 13', which are mounted perpendicularly on the support shaft of the screw 11 concerned and come into mutual inter-penetrating engagement with a corresponding group of separate, flat and level blades 13" fixed in the trough 11' or on the other screw 11.

As an example of a preferred embodiment, the or each screw mixer 3 may comprise a mixer as described in French patent application no. 2003999 filed on 22 Apr. 2020 in the name of the applicant.

As previously indicated, the microscopic separating means 6, which preferably thus perform a size reduction operation, may comprise various apparatus or various assemblies of apparatus.

Figure 9:
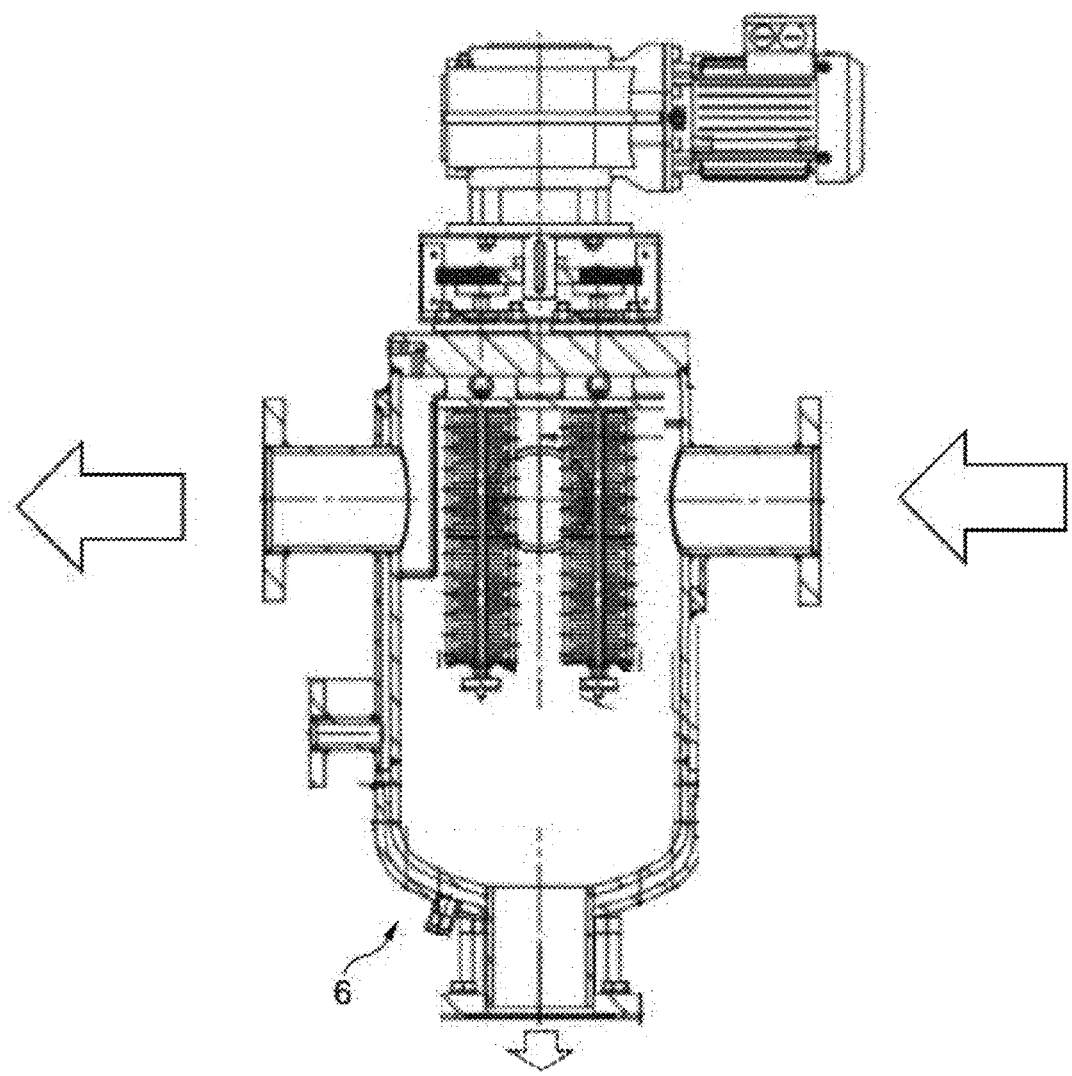
FIG. 9 is a sectional view of a filter which may serve as a microscopic separating means according to a first variant embodiment of the invention.

Thus, as shown in FIG. 9, said means 6 may comprise in particular a filter suitable for bitumen-based viscous products, for example a filter of the type known as SCAMDISC (registered trademark) from the company SCAM filters.

Figure 10A:
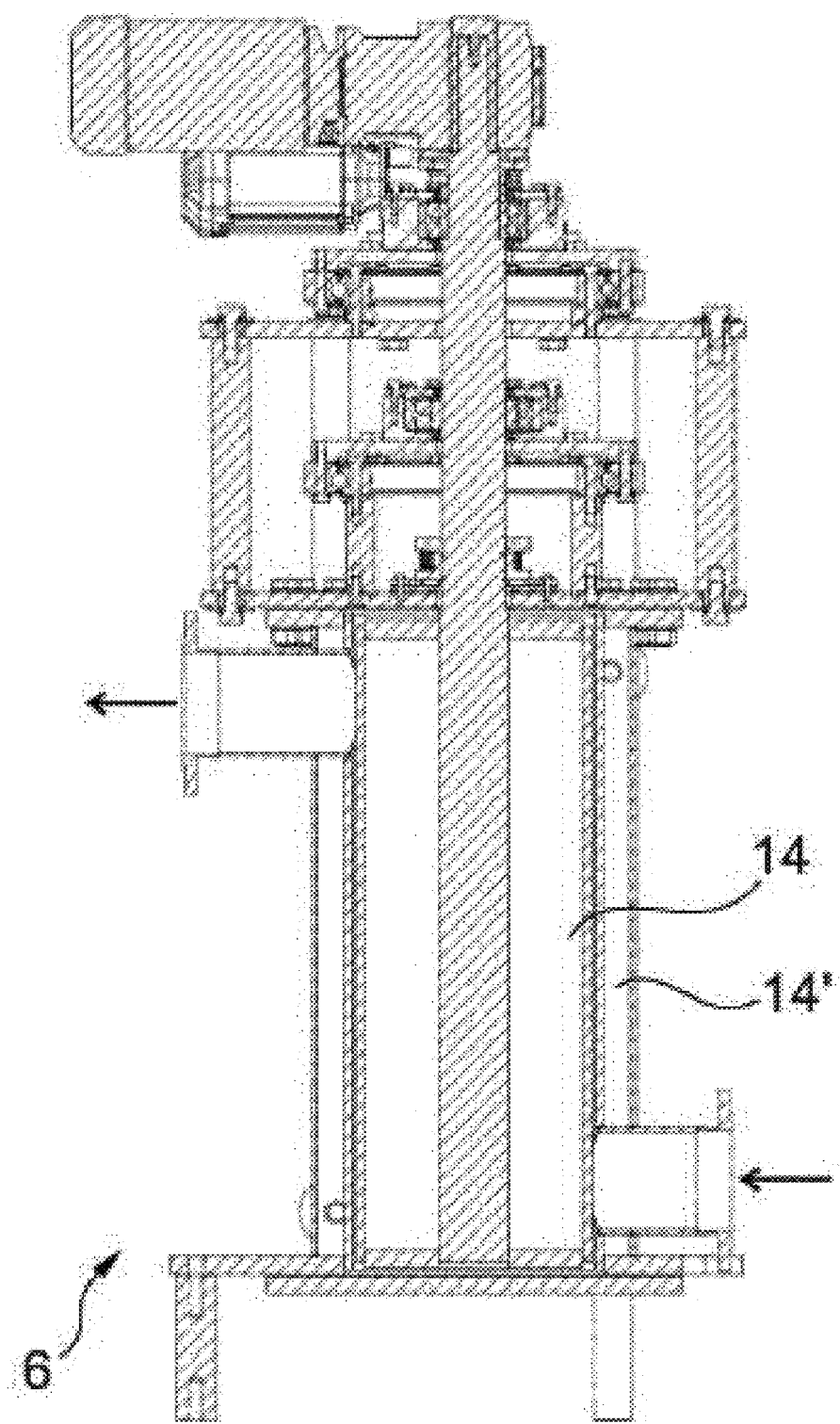
FIG. 10A is a sectional view of a refiner with two inter-penetrating cylinders (doubly rotating interior cylinder) forming a microscopic separation means according to a second variant embodiment of the invention.
Figure 10B:
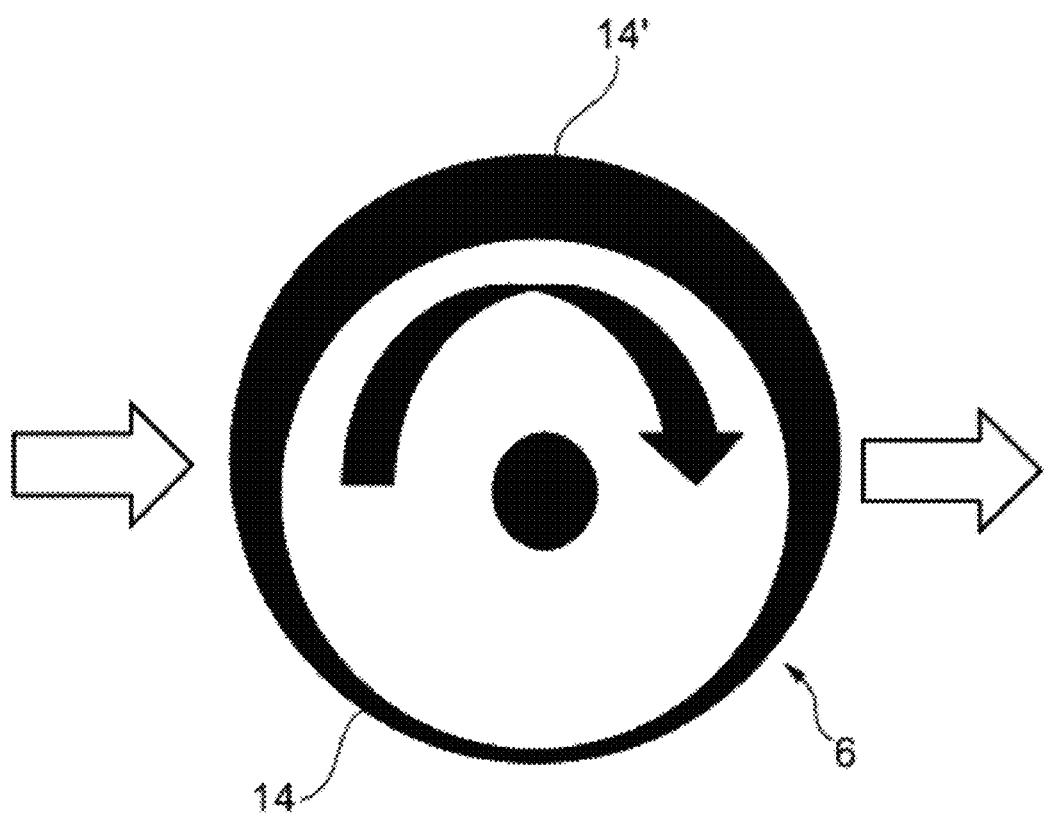
FIG. 10B is a schematic view, from above and in cross-section, of the refiner from FIG. 10A.

However, preferably, the microscopic separating means 6 consist of a refiner with two inter-penetrating cylinders 14, 14', at least one of which 14 (inner cylinder or cylindrical drum) is driven in an eccentric rotational movement as shown on FIGS. 10A and 10B, and possibly also or alternatively in a rotational movement about its own axis.

Such a refiner is described in patent application no. 2004002 filed on 22 Apr. 2020 in the name of the applicant.

Advantageously, the installation may comprise, after the crushing means 4, 4' or the last cylinder crusher 4', in succession a heated transfer pump 9, a refiner with eccentric rotary cylinder(s) 6 and a filter 15, for example a filter of the above-mentioned type or of the Trigonal type (registered trademark) from the company Siefer.

The invention also concerns a method for treating composite products 2 based on thermoplastic material(s), more particularly waste containing mainly bituminous membranes 2', said method comprising at least successive operational stages of heating, size reduction, crushing and separation, said treatment being performed in a continuous or intermittent global flow, possibly regulated.

This method is characterized in that it consists of performing the above-mentioned treatment operations by means of an installation 1 as described above and illustrated for example on the appended figures.

Naturally, the invention is not limited to the embodiments described and depicted on the appended figures. Modifications remain possible, in particular with respect to the constitution of various elements or by substitution of technical equivalents, without leaving the scope of protection of the invention.

The invention claimed is:

1. An installation for treating composite products based on thermoplastic material for recycling purposes, said installation comprising:
   at least one means for heating and size reduction, at least one means for crushing, and at least one means for separation, each of said means being arranged so as to form at least one line for treating and extracting said composite products based on thermoplastic materials to be reused, said at least one line operating with either one of a continuous or intermittent flow,
   wherein:
   the at least one means for heating and size reduction comprises at least one heated screw mixer receiving the composite products based on thermoplastic material, configured to allow passage of macroscopic particles, and delivering a heterogenous output product in a liquid form or a viscous form;
   the at least one crushing means comprises at least one cylinder crusher comprising two heated rolling cylinders which are driven in rotation in opposite directions, the two cylinders having a passage gap therebetween, into which
   the output product from the at least one heated screw mixer is introduced by falling under an effect of gravity;
   the at least one separating means comprises at least one macroscopic separating means in a form of a device for discharging macroscopic contaminating particles which are present in the output product, and which are not or not sufficiently reduced by the two heated rolling cylinders; and
   the at least one separating means further comprise at least one microscopic separating means, which is selected from a group formed by a filter suitable for the composite products based on thermoplastic material, a reducer, a refiner, a grinding pump, a comminutor, or a combination of two from such group.

2. The installation as claimed in claim 1, wherein the device for discharging macroscopic contaminating particles is arranged below at least one of the two heated rolling cylinders in a fall path of a flow of output product exiting the at least one heated rolling cylinder, and wherein the device for discharging comprises a movable means for in-flight ejection or extraction of said macroscopic contaminating particles from a flow of output product, with or without temporary interruption of said flow of output product, in response to an actuation signal supplied by said at least one cylinder crusher.

3. The installation as claimed in claim 2, wherein the actuation signal corresponds to an abnormal movement of at least one movably mounted cylinder of the two cylinders of the at least one cylinder crusher, or to an abnormal increase in the passage gap between the two heated rolling cylinders, caused by the passage gap between the two heated rolling cylinders of a least one contaminating particle which has a size exceeding a threshold value and which is resistant to crushing.

4. The installation as claimed in claim 1, wherein the device for discharging macroscopic contaminating particles further comprises an element, movable by pivoting or translation, which expels a target contaminating particle from a flow of output product or temporarily diverts or interrupts said flow of output product, in a form of a sheet or screen, following an actuation command.

5. The installation as claimed in claim 1, wherein the at least one crushing means further comprises at least two successive cylinder crushers which have different sizes of gap, and are arranged one below the other, aligned relative to a falling flow of output product, the device for discharging macroscopic contaminating particles being arranged between the first crusher and the second crusher.

6. The installation as claimed in claim 1, wherein the at least one heated screw mixer comprises two parallel heating screws mounted in a heating trough and having discontinuous helical threads, which are mutually inter-penetrating and each formed from separate, flat and level blades mounted in an inclined manner on a support shaft of each of the two parallel heating screws.

7. The installation as claimed in claim 6, wherein the at least one heated screw mixer further comprises at least one shearing module formed by at least a first group of separate, flat and level blades, which are mounted perpendicularly on the support shafts of the two parallel heated screws, and come into mutual inter-penetrating engagement with a corresponding group of separate, flat and level blades fixed in the trough or on another of the two parallel heating screws.

8. The installation as claimed in claim 1, wherein the at least one microscopic separating means includes a refiner with two inter-penetrating cylinders, at least one of which is driven in an eccentric rotational movement.

9. The installation as claimed in claim 1, wherein said installation comprises, after the at least one crushing means or the last cylinder crusher, in succession, a heated transfer pump, a refiner with eccentric rotary cylinder(s), and a filter.

10. A method for treating composite products based on thermoplastic material, said method comprising:
    at least successive operational stages of heating and size reduction, crushing, and separation, said treatment being performed in a continuous or intermittent global flow,
    wherein said method includes performing treatment operations by the installation as claimed in claim 1.

11. The installation as claimed in claim 1 wherein the at least one microscopic separating means of the at least one separating means has a reduction in size from a first size of at least one centimeter to a size of less than one centimeter.

12. The installation as claimed in claim 1, wherein the composite products based on thermoplastic material(s) is waste containing mainly bituminous membranes.

13. The installation as claimed in claim 1, wherein said heterogenous output product in liquid or viscous form, is charged with particles and fibers.

14. The installation as claimed in claim 1, wherein the installation further comprises a means for supplying the composite products into the heated screw mixer and a means for transfer and/or storage of a decontaminated output product and/or a recycled material from said separating means of said installation.

* * * * *